US012124207B2

(12) United States Patent
Yamamoto

(10) Patent No.: US 12,124,207 B2
(45) Date of Patent: Oct. 22, 2024

(54) IMAGE FORMING APPARATUS INCLUDING BUTTON PORTION EXPOSED TO OUTSIDE OF CASING

(71) Applicant: CANON KABUSHIKI KAISHA, Tokyo (JP)

(72) Inventor: Daisuke Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/164,503

(22) Filed: Feb. 3, 2023

(65) Prior Publication Data

US 2023/0266697 A1 Aug. 24, 2023

(30) Foreign Application Priority Data

Feb. 24, 2022 (JP) ................................ 2022-026376

(51) Int. Cl.
*G03G 21/16* (2006.01)
*G03G 15/00* (2006.01)
*G03G 15/16* (2006.01)

(52) U.S. Cl.
CPC ..... *G03G 21/1619* (2013.01); *G03G 15/5016* (2013.01); *G03G 15/1605* (2013.01)

(58) Field of Classification Search
None
See application file for complete search history.

(56) References Cited

U.S. PATENT DOCUMENTS

2010/0116637 A1* 5/2010 Kano ................. G03G 15/5016 200/345
2020/0065038 A1* 2/2020 Tokoro ................... H01H 21/24

FOREIGN PATENT DOCUMENTS

JP H1014158 A 1/1998

* cited by examiner

*Primary Examiner* — Arlene Heredia
(74) *Attorney, Agent, or Firm* — Canon U.S.A., Inc. I.P. Division

(57) ABSTRACT

An image forming apparatus incudes an outer casing, a button portion including a pressed portion, a support portion and a deformable portion, and a regulation portion configured to come into contact with the support portion to regulate a position of the button portion. The button portion is movable from a first positon to a second position when the pressed portion is pressed. When the button portion is moved from the first position to the second position, the outer casing of the image forming apparatus slides with the button portion and a force is applied in a second direction orthogonal to a first direction to cause the deformable portion of the support portion to deform and the button portion to move in the second direction.

11 Claims, 8 Drawing Sheets

IMAGE FORMING APPARATUS INCLUDING BUTTON PORTION EXPOSED TO OUTSIDE OF CASING

CROSS REFERENCE TO RELATED APPLICATIONS

This application claims the benefit of priority from Japanese Patent Application No. 2022-026376, filed Feb. 24, 2022, which is hereby incorporated by reference herein in its entirety.

BACKGROUND

Field of the Disclosure

The present disclosure relates to an image forming apparatus.

Description of the Related Art

Conventionally, an image forming apparatus such as an electrophotographic printer (e.g., electrophotographic copying machine, light-emitting diode (LED) printer, and laser beam printer), an electrophotographic facsimile machine, and an electrophotographic word processor have been often configured to include mechanical buttons because the configuration using mechanical buttons is inexpensive.

For example, there is a configuration in which a dedicated spring is used to return a power button to its original position as discussed in Japanese Patent Application No. 10-14158.

If a dedicated spring is used for configuring a button, there may be an issue that the number of components constituting an image forming apparatus may increase.

SUMMARY

According to an aspect of the present disclosure, an image forming apparatus configured to form an image on a sheet includes an outer casing including a surface extending in a second direction that is orthogonal to a first direction, a substrate provided with a contacted portion, a button portion, including a pressed portion forming an exterior of the image forming apparatus together with the outer casing, a support portion configured to support the pressed portion and including a deformable portion configured to deform in the second direction, and a contact portion extending from the support portion in the first direction and configured to come into contact with the contacted portion, and the button portion configured to move from a first position at which the contact portion is not in contact with the contacted portion to a second position at which the contact portion is in contact with the contacted portion by the pressed portion being pressed in the first direction, and a regulation portion configured to come into contact with the support portion and regulate a position of the button portion, wherein when the pressed portion is pressed in the first direction and the button portion is caused to rotate, a part of the support portion is regulated by the regulation portion and the button portion and the outer casing slide with each other, and wherein when a force in the second direction is applied to the deformable portion due to sliding between the button portion and the outer casing and the deformable portion is caused to deform, the button portion is moved to the second position.

Further features of the present disclosure will become apparent from the following description of embodiments with reference to the attached drawings.

DESCRIPTION OF THE EMBODIMENTS

An embodiment according to the present disclosure will be described with reference to FIGS. 1 to 6.

Figure 1:
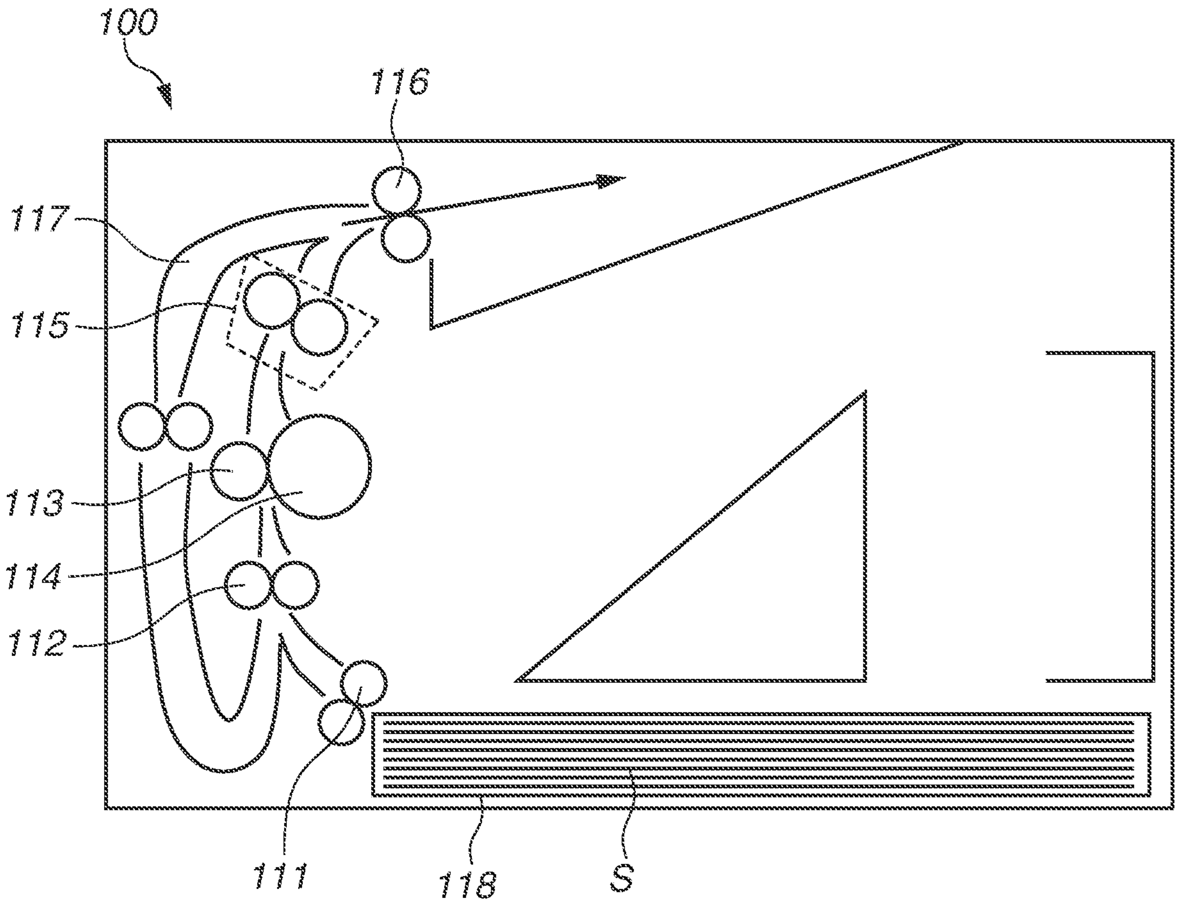
FIG. 1 is a cross-section diagram schematically illustrating an image forming apparatus according to a first embodiment.

FIG. 1 is a cross-section diagram schematically illustrating an image forming apparatus 100 according to a first embodiment. A laser beam printer serving as an example of the present disclosure includes an image forming unit for forming an image, a sheet feeding device for separating sheets one by one and feeding the sheet to the image forming unit, a laser scanner unit, a fixing device, and a discharge tray. The image forming unit includes a process cartridge attachable to and detachable from a main body of the laser beam printer, and a transfer roller. Further, the process cartridge includes a photosensitive drum, a charging roller, a developing unit, and a cleaning unit.

When image information is transmitted from a personal computer or the like, and a control unit that has performed image forming processing on the image information issues a print instruction, as illustrated in FIG. 1, a sheet feeding roller 111 rotates to convey a sheet S stacked in a sheet feeding cassette 118 to a transfer roller 113 by a conveyance roller pair 112. On the other hand, an electrostatic latent image is formed on a photosensitive drum 114 by an exposure performed by a laser unit (not illustrated) based on the print instruction and the image information. Further, a toner image is formed on the photosensitive drum 114 by a developing unit (not illustrated).

Then, the toner image is transferred onto the sheet S to form an image on the sheet S at a nip portion formed by the photosensitive drum 114 and the transfer roller 113. Then, the sheet S is conveyed to a fixing device 115 and the image is fixed onto the sheet S. Then, the sheet S is discharged onto a discharge tray by a sheet discharge roller pair 116. Further, in a case of duplex printing, the sheet S is conveyed to the fixing device 115 and then reversed by the sheet discharge roller pair 116. The sheet S passes through a both-surface path 117, and is discharged after an image is formed on a side of the sheet S on which no image has been formed. In addition, in the configuration according to the present embodiment, the sheet S is discharged by the sheet discharge roller pair 116 in a direction indicated by an arrow illustrated in FIG. 1.

Figure 2:
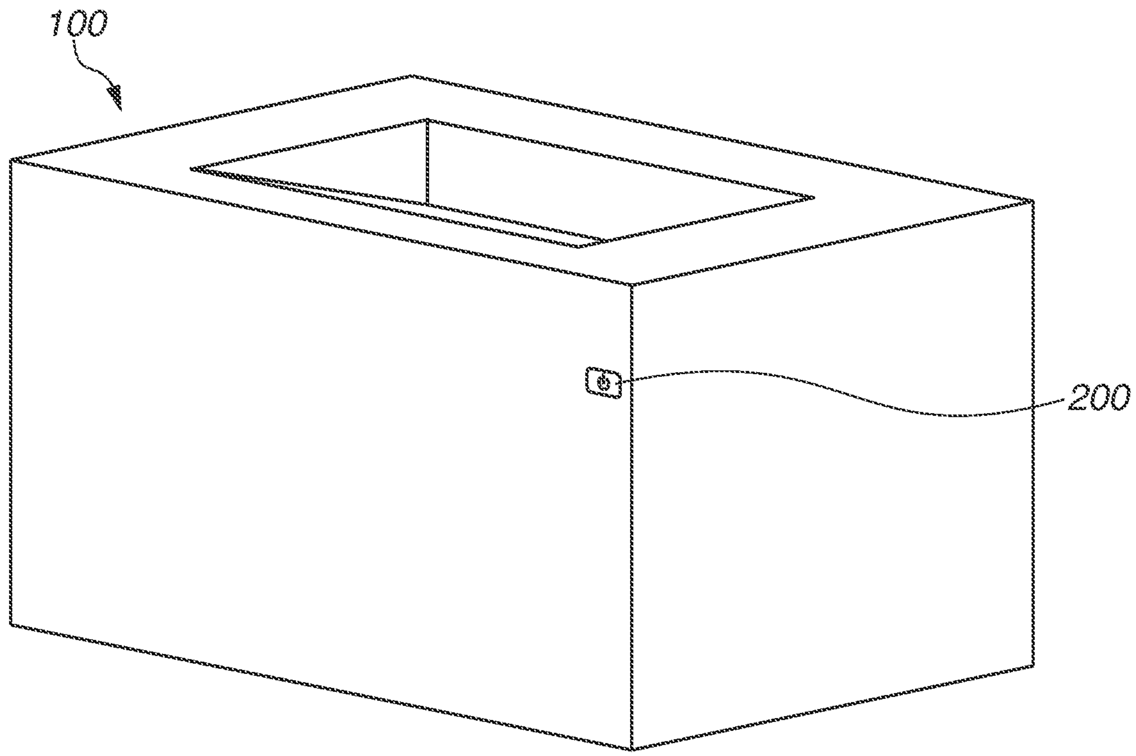
FIG. 2 is a perspective view illustrating an external appearance of the image forming apparatus according to the first embodiment.

Next, with reference to FIGS. 2 to 6, a configuration of a button according to the present embodiment will be described using a power button (button portion) 200 as an example of the button of the image forming apparatus 100. FIG. 2 is a perspective view illustrating an external appearance of the image forming apparatus 100. As illustrated in FIG. 2, the power button 200 is provided at an upper right on the front side of the image forming apparatus 100.

Figure 3:
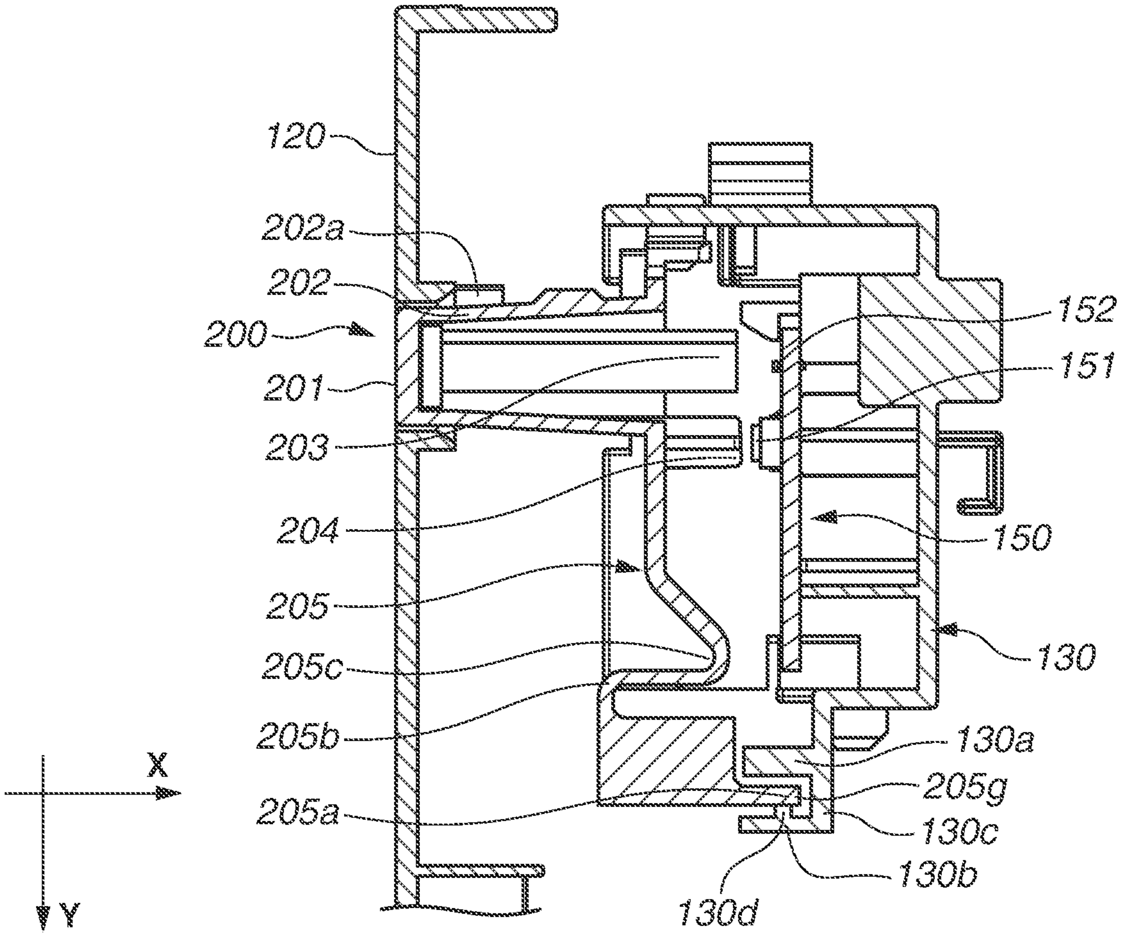
FIG. 3 is a cross-section diagram illustrating a power button viewed from a side, according to the first embodiment.
Figure 5:
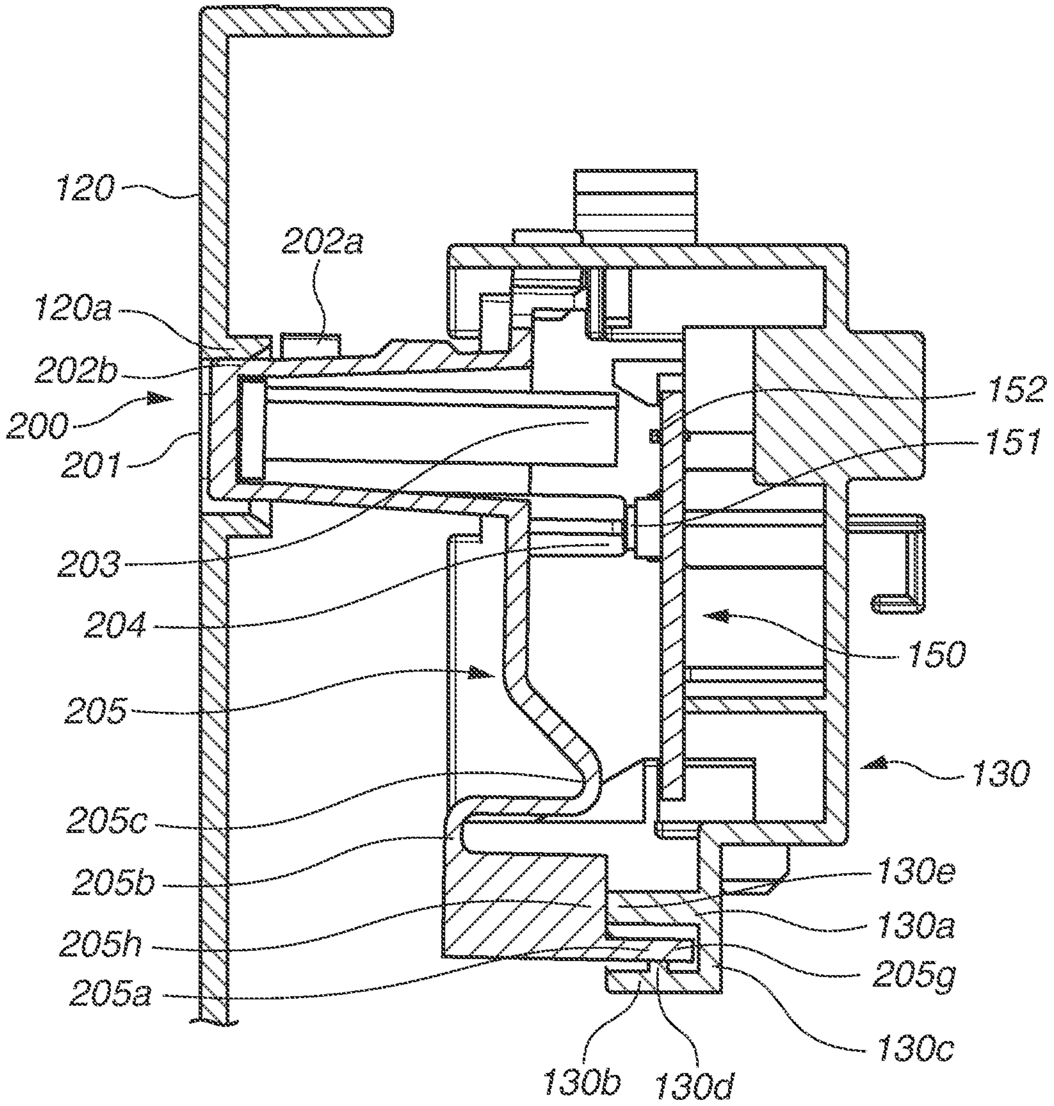
FIG. 5 is a cross-section diagram illustrating a state where the power button is pressed, according to the first embodiment.

For the convenience of explanation, the rightward direction on the sheet surface in each of FIGS. 3 and 5 is defined as a first direction, and the downward direction, which is orthogonal to the first direction, on the sheet surface in each of FIGS. 3 and 5 is defined as a second direction. More specifically, the X direction in FIG. 3 is the first direction, and the Y direction in FIG. 3 is the second direction. The discharge direction in which the sheet S with an image formed thereon is discharged intersects with the second direction.

Figure 4:
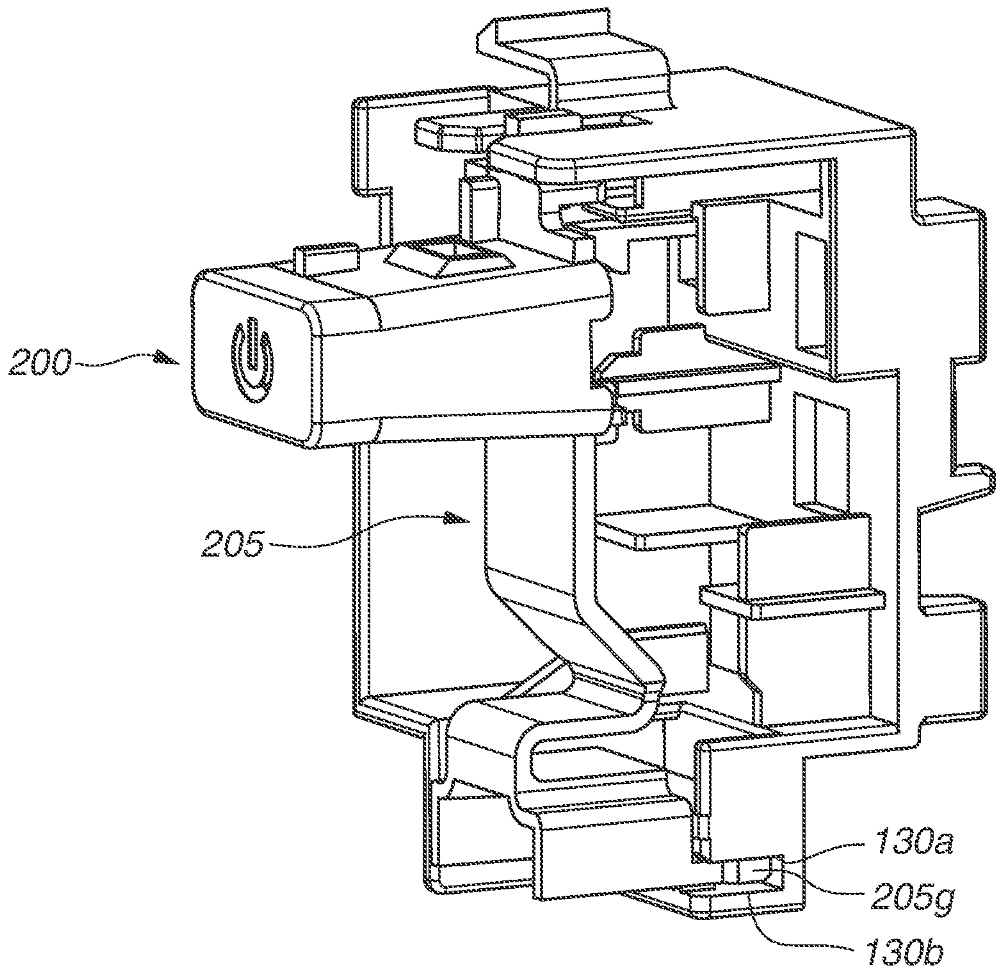
FIG. 4 is a perspective view illustrating a relationship between the power button and a frame, according to the first embodiment.

FIG. 3 is a cross-section diagram illustrating an area in the vicinity of the power button 200 when viewed from a side, and FIG. 4 is a perspective view illustrating a relationship between the power button 200 and a frame 130. An outer casing 120 of the image forming apparatus 100 includes a surface in which the power button 200 is arranged, the surface of the outer casing 120 extends in the second direction. The power button 200 includes a pressed portion 201 (portion to be pressed), a side peripheral portion 202, a light guide 203, a contact portion 204, and a support portion 205. One end of the support portion 205 is positioned by the frame 130 of an apparatus main body to support the power button 200. In other words, the frame 130 serves as a regulation member that supports the power button 200 and regulates the position of the power button 200. The support portion 205 includes curved portions 205*b* and 205*c* as deformable portions, and a regulated portion (portion to be regulated) 205*g*.

The pressed portion 201 forms a part of an exterior of the image forming apparatus 100, and the image forming apparatus 100 is powered ON/OFF by pressing the pressed portion 201. The light guide 203 has a role of transmitting light emitted from a light-emitting diode (LED) 152 to be described below to the pressed portion 201. The contact portion 204 extends from the support portion 205 in the first direction, and has a role of coming into contact with a contacted portion (portion to be contacted to) 151 to be described below when the pressed portion 201 is pressed. In other words, it can be said that the pressed portion 201 and the side peripheral portion 202 is supported by the support portion 205.

The frame 130 and the regulated portion 205*g* will be described in detail. As illustrated in FIG. 3, the frame 130 includes an upper portion 130*a*, a bottom portion 130*b*, a rear end portion 130*c*, and a holding portion 130*d* as regulation portions. The rear end portion 130*c* is located on an extended line of the regulated portion 205*g*, and the upper portion 130*a* and the bottom portion 130*b* face each other and are connected by the rear end portion 130*c*. A held portion (portion to be held) 205*a* of the regulated portion 205*g* comes into contact with the holding portion 130*d* and then own weight of the power button 200 is received.

The side peripheral portion 202 includes a protruding portion 202*a*. Normally, a force for tilting the power button 200 in the left direction in FIG. 3 is applied to the power button 200 due to its own weight. However, the force for tilting the power button 200 in the left direction due to its own weight is received by the protruding portion 202*a* being in contact with the outer casing 120 of the apparatus main body. With this configuration, it is possible to increase the accuracy of the surface forming the exterior of the image forming apparatus 100 which is formed by the outer casing 120 and the pressed portion 201. In addition, the position of the power button 200 at this time is defined as a first position. When the power button 200 is at the first position, the contact portion 204 is not in contact with the contacted portion 151. Further, the power button 200 is positioned at the first position by, the held portion 205*a* being in contact with the holding portion 130*d*, and the protruding portion 202*a* being in contact with the outer casing 120.

Next, a substrate 150 provided in the apparatus main body will be described. The substrate 150 includes the contacted portion 151 and the LED 152 serving as an emission unit. The contacted portion 151 and the contact portion 204 come into contact with each other when the pressed portion 201 is pressed, and the contacted portion 151 has a role of receiving an instruction to turn ON/OFF the power of the image forming apparatus 100. Specifically, the contacted portion 151 is a switch element. The LED 152 is controlled to switch the light emission state based on the state of the image forming apparatus 100, and has a role of displaying the state of the image forming apparatus 100 to users.

Figure 6:
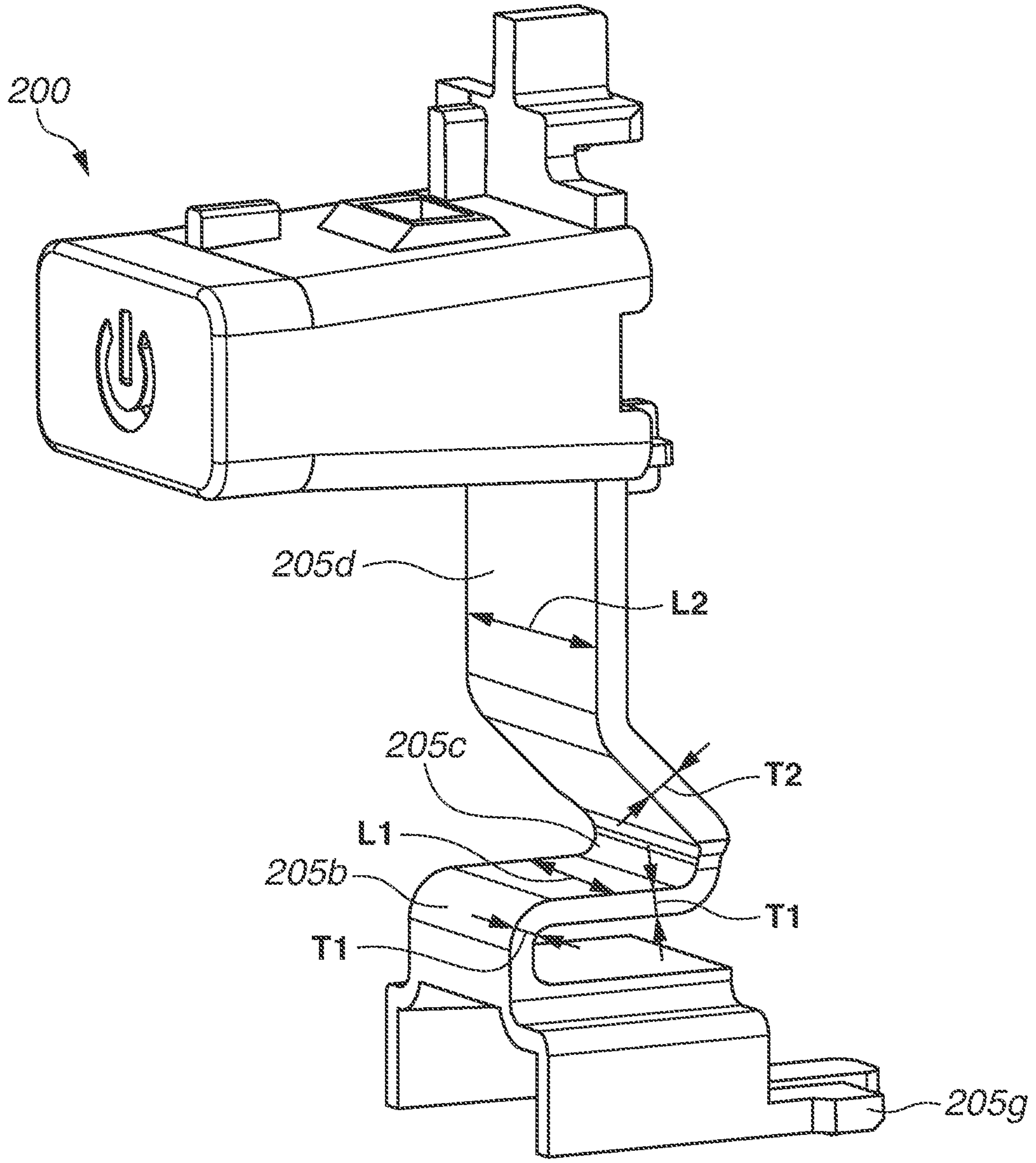
FIG. 6 is a perspective view illustrating the power button according to the first embodiment.

Next, with reference to FIGS. 5 and 6, a state where the power button 200 is pressed will be described. FIG. 5 is a cross-section diagram illustrating the state where the power button 200 is pressed. FIG. 6 is a perspective view illustrating the power button 200. In FIG. 6, the regulated portion 205*g* is regulated by the frame 130 of the apparatus main body so that the power button 200 is allowed to tilt in directions of clockwise rotation and counterclockwise rotation in FIG. 5. In other words, in FIG. 3, the regulated portion 205*g* extends horizontally, and a gap is formed between the upper portion 130*a* and the bottom portion 130*b* of the frame 130 so that the regulated portion 205*g* can tilt clockwise and counterclockwise.

When the pressed portion 201 is pressed in the first direction, the power button 200 rotates clockwise in FIG. 5 with the held portion 205*a* as a center. Then, as illustrated in FIG. 5, the movement of the power button 200 in the first direction is regulated by a part of the support portion 205 abutting on the upper portion 130*a*. More specifically, an abutting portion 205*h* of the support portion 205 is in contact with an abutted portion (portion to be abutted) 130*e* of the frame 130. However, the movement of the power button 200 in the first direction may be regulated by a method of, for example, causing the regulated portion 205*g* to come into contact with the rear end portion 130*c*. In the present embodiment, the position at which the movement of the power button 200 is regulated in the first direction by the upper portion 130*a* being in contact with the support portion 205 is located at a position nearer to the pressed portion 201 than to the contacted portion 151 in the first direction.

Further, when the pressed portion 201 is pressed in the first direction, a side sliding portion 202*b* of the side peripheral portion 202 moves in an upper right direction in FIG. 5 and comes into contact with a casing sliding portion 120*a* of the outer casing 120. A force in the second direction is applied to the support portion 205 when the side sliding portion 202*b* and the casing sliding portion 120*a* come into contact with each other and slide with each other.

When the force is applied to the support portion 205 in the second direction, the curved portions 205*b* and 205*c* deform to curve so that the pressed portion 201 moves in the second direction. This deformation enables the frictional force between the side sliding portion 202*b* and the casing sliding portion 120*a* to be smaller, and the power button 200 to be pushed in. Thus, the pressed portion 201 moves in the first direction. When the power button 200 is pushed in, the contact portion 204 and the contacted portion 151 are bought into contact with each other. The power ON/OFF of the image forming apparatus 100 can be switched by the contact portion 204 coming into contact with the contacted portion 151. The position of the power button 200 in a state where the contact portion 204 is in contact with the contacted portion 151 is defined as a second position.

When the force applied to the pressed portion 201 in the first direction is released by, for example, releasing the user's finger from the power button 200, the power button 200 moves to the first position due to its own weight. Further, in the present embodiment, the held portion 205*a*, the deformable portion, and the pressed portion 201 are arranged in this order when viewed from one end side of the support portion 205 along the portion forming the power button 200.

With reference to FIG. 6, a configuration of the support portion 205 will be described. The support portion 205 includes a straight portion 205*d* extending in the second direction. A thickness T1 of the deformable portion and the vicinity of the deformable portion is thinner than a thickness T2 of the straight portion 205*d* (i.e., T1<T2), and has an easily deformable shape. More specifically, since the deformable portion is lower in stiffness than the straight portion 205*d*, the deformable portion can be deformed easier than the straight portion 205*d* when the force is applied the support portion 205 in the second direction.

Further, a width L1 in the deformable portion and the vicinity of the deformable portion is less than a width L2 of the straight portion 205*d* (i.e., L1<L2). This configuration enables elastic deformation to easily occur in the portion so that the operability of the power button 200 is improved while keeping the durability of the support portion 205. In the present embodiment, the curved portions 205*b* and 205*c* form a portion between a portion of the support portion 205 extending in the first direction and a portion thereof extending in the direction opposite to the first direction.

Further, in the present embodiment, the straight portion 205*d* is provided on only one side of the pressed portion 201 in the second direction. More specifically, the held portion 205*a* and the curved portions 205*b* and 205*c* are provided on only one side of the pressed portion 201 in the second direction. In this way, even in a case where there is little space in the vicinity the power button 200, the support portion 205 can be provided in an empty space. Further, since the power button 200 is returned to the first position by the elastic force of the support portion 205 and no dedicated spring member is used, the number of components constituting the power button 200 can be reduced.

Figure 7:
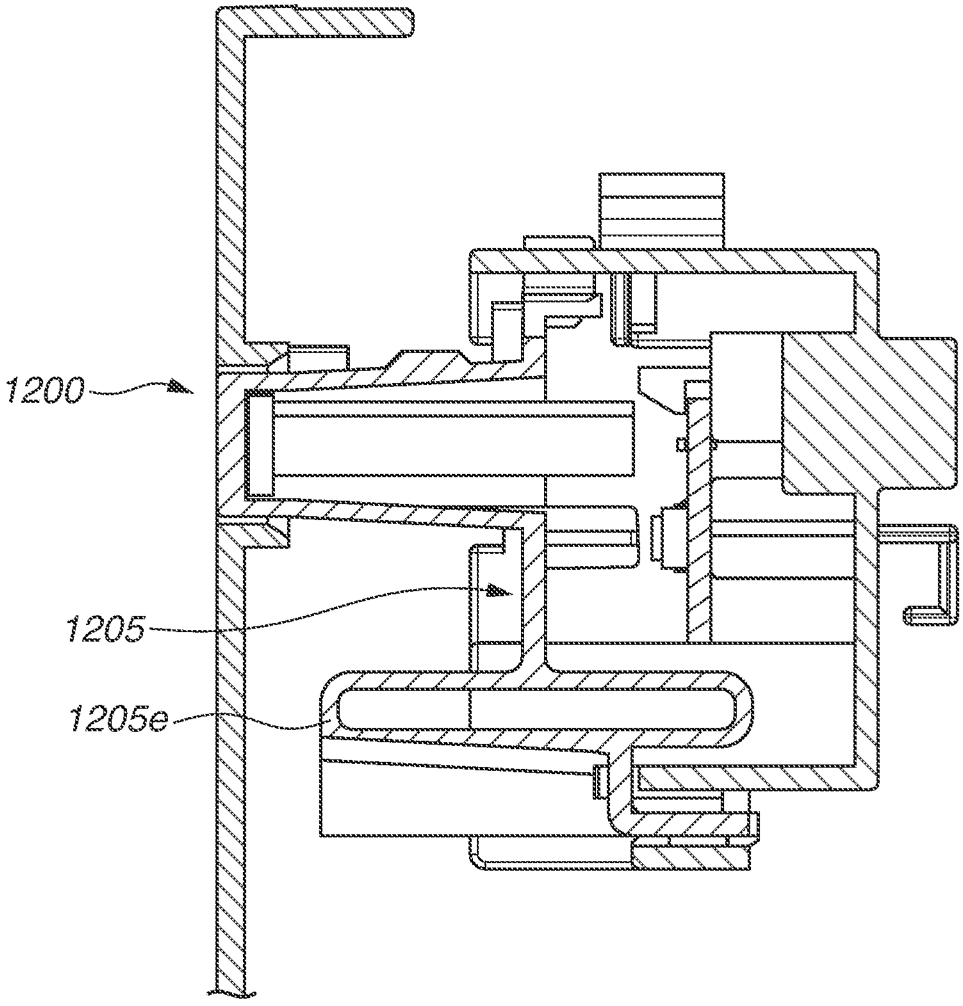
FIG. 7 is a cross-section diagram illustrating a vicinity of a power button according to a modification example 1 of the first embodiment.

Next, with reference to FIG. 7, a modification example 1 of the first embodiment will be described. FIG. 7 is a cross-section diagram illustrating a vicinity of a power button 1200 according to the modification example 1 of the first embodiment. As illustrated in FIG. 7, a deformable portion 1205*e* may have any shape. In the modification example 1, a support portion 1205 is configured to form a hollow circular shape.

Figure 8:
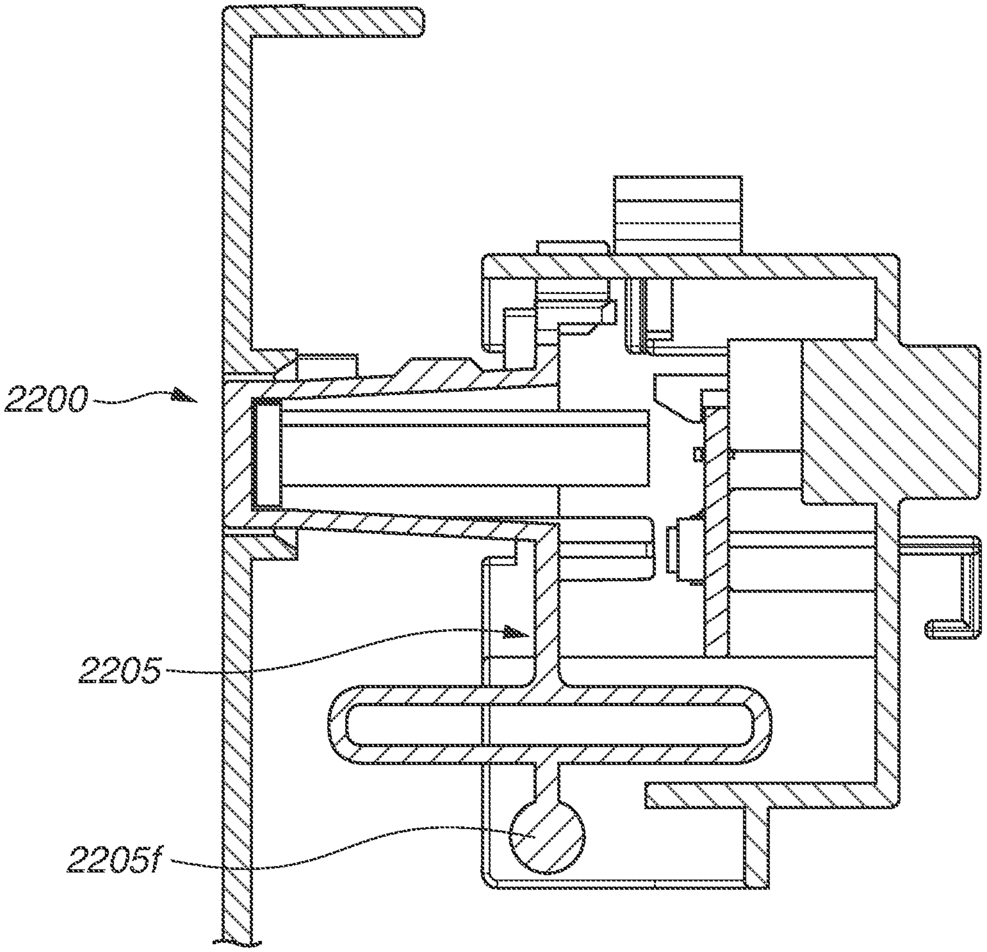
FIG. 8 a cross-section diagram illustrating a vicinity of a power button according to a modification example 2 of the first embodiment.

Further, with reference to FIG. 8, a modification example 2 of the first embodiment will be described. FIG. 8 is a cross-section diagram illustrating a vicinity of a power button 2200 according to the modification example 2 of the first embodiment. In the modification example 2, the power button 2200 is rotatable with a rotational portion 2205*f* of a support portion 2205 as a center. At this time, the power button 2200 is urged due to its own weight in the direction opposite to the first direction, which is the left direction in FIG. 8, (i.e., a force for tilting in the direction opposite to the first direction is applied to the power button 2200).

As described above, with the configurations described in the present embodiment, it is possible to reduce the number of components constituting the power button 2200.

According to the present disclosure, it is possible to provide an image forming apparatus in which a button can be moved without using a dedicated spring member.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. An image forming apparatus configured to form an image on a sheet, the image forming apparatus comprising:
- an outer casing including a surface extending in a second direction that is orthogonal to a first direction;
- a substrate provided with a switch element;
- a button portion, including (i) a pressed portion exposed to outside of the outer casing and forming an exterior of the image forming apparatus together with the outer casing, ii) a support portion connecting with the pressed portion and including a curved portion configured to deform in the second direction and a regulated portion, and (iii) a contact projection extending from the support portion in the first direction and configured to come into contact with the switch element, and the button portion configured to move from a first position at which the contact projection is not in contact with the switch element to a second position at which the contact projection is in contact with the switch element portion by the pressed portion being pressed in the first direction; and
- a regulation portion configured to come into contact with the regulated portion such that the button portion is supported by the regulation portion and regulate a position of the button portion, the regulation portion including a first portion and a second portion, the first portion and the second portion face each other such that a gap is formed between the first portion and the second portion,
- wherein the regulated portion is inserted to the gap such that the button portion is tiltable relative to the regulation portion, and when the pressed portion is pressed in the first direction, the button portion slidably contacts the outer casing, and
- wherein when the button is moved to the second position, a force in the second direction is applied to the curved portion due to sliding between the button portion and the outer casing and the curved portion is caused to deform.

2. The image forming apparatus according to claim 1, wherein the substrate includes a light emitting unit, and the button portion includes a light guide that transmits the light emitted from the light emitting unit.

3. The image forming apparatus according to claim 1, wherein a direction in which the sheet with the image formed thereon is discharged intersects with the second direction.

4. The image forming apparatus according to claim 1, wherein the support portion includes a straight portion extending in the second direction, and the curved portion has a smaller thickness and a smaller width than those of the straight portion.

5. The image forming apparatus according to claim 1, wherein the curved portion forms a portion between a portion of the support portion extending in the first direction and a portion of the support portion extending in a direction opposite to the first direction.

6. The image forming apparatus according to claim 1, wherein the curved portion is disposed between the contact projection and the regulated portion.

7. The image forming apparatus according to claim 6, wherein the contact projection is disposed between the pressed portion and the curved portion.

8. The image forming apparatus according to claim 7, wherein the contact projection and the curved portion are disposed between the pressed portion and the regulated portion.

9. The image forming apparatus according to claim 8, wherein the contact projection is closer to the pressed portion than to the regulated portion, and the curved portion is closer to the regulated portion than to the pressed portion.

10. The image forming apparatus according to claim 1, further comprising a frame including the regulation portion.

11. The image forming apparatus according to claim 1, wherein the curved portion includes a first curved portion and a second curved portion.

* * * * *